US010852044B1

(12) United States Patent
Elliott et al.

(10) Patent No.: US 10,852,044 B1
(45) Date of Patent: Dec. 1, 2020

(54) SIMPLE LOW-COST RETROFIT DEVICE AND METHOD TO REPLACE A VARIABLE AIR FLOW ELECTRONICALLY COMMUTATED MOTOR WITH A PERMANENT SPLIT CAPACITOR MOTOR CAPABLE OF OPERATING AT MULTIPLE SPEED SETTINGS

(71) Applicant: Mainstream Engineering Corporation, Rockledge, FL (US)

(72) Inventors: Dana L. Elliott, Palm Bay, FL (US); Luke Falls, Orlando, FL (US); Robert P. Scaringe, Rockledge, FL (US); David C. Hahn, Rockledge, FL (US)

(73) Assignee: Mainstream Engineering Corporation, Rockledge, FL (US)

( * ) Notice: Subject to any disclaimer, the term of this patent is extended or adjusted under 35 U.S.C. 154(b) by 263 days.

(21) Appl. No.: 15/058,313

(22) Filed: Mar. 2, 2016

(51) Int. Cl.
F25B 49/02 (2006.01)
F24F 1/0007 (2019.01)
F24F 11/77 (2018.01)

(52) U.S. Cl.
CPC .......... F25B 49/025 (2013.01); F24F 1/0007 (2013.01); F24F 11/77 (2018.01)

(58) Field of Classification Search
CPC ........ F24F 11/0079; F24F 11/30; F24F 11/70; F24F 11/72; F24F 11/74; F24F 11/77; F24F 1/0007; F25B 2313/0293; F25B 2600/11; F25B 49/025; F25B 2313/0294; F25B 2313/0314; F25B 2600/111; F25B 2600/112; F25B 2700/172; F25B 2700/173; F25B 2700/2117; F25B 2700/21171; F25B 2700/21172; F25B 2700/21173;
(Continued)

(56) References Cited

U.S. PATENT DOCUMENTS 4,648,551 A 3/1987 Thompson et al.
4,860,231 A 8/1989 Ballard et al.
5,303,561 A 4/1994 Bahel et al.
(Continued)

OTHER PUBLICATIONS

Scaringe et al. QwuikSEER+ Theory of Operation and Retrofit Potential. Mainstream Engineering Corporation. Mar. 2013 entire document.*
Youtube video, QwikSEER+ WattSaver—QT600. Qwik Products by Mainstream Engineering. Youtube video. Aug. 13, 2012. Retrieved from the internet: <URL: https://www.youtube.com/watch?v=upkbJ6hdBFY>.*

(Continued)

Primary Examiner — Tavia Sullens
(74) Attorney, Agent, or Firm — Michael W. O'Neill, Esq.

(57) ABSTRACT

A device and method are provided to allow replacement of costlier motors with a retrofittable control board and a lower cost motors operating a several speeds to provide variable (but not continuously variable) blower airflow. The control signals normally used to command the motor being replaced are only used to detect the need to activate the blower motor; once detected, the control board activates the replacement blower motor by energizing a blower motor speed tap with the evaporator blower initially set to a high speed. Then the blower speed is lowered if a predetermined negligibly small, acceptable change in evaporator temperature has occurred. Given the number of speed taps on the replacement blower motor, the evaporator blower speed is continued to be reduced from the initially set high speed as long as there is only an acceptably small change in the measured evaporator temperature.

2 Claims, 9 Drawing Sheets

(58) Field of Classification Search
CPC . F25B 2700/21174; F25B 2700/21175; H01R 13/6658
USPC ............... 62/77; 439/76.1; 361/86, 87, 103, 361/748–752, 807–810
See application file for complete search history.

(56) References Cited

U.S. PATENT DOCUMENTS

| | | | | |
|---|---|---|---|---|
| 5,818,194 | A * | 10/1998 | Nordby | F04D 27/004 |
| | | | | 318/701 |
| 6,070,660 | A * | 6/2000 | Byrnes | F04D 27/00 |
| | | | | 165/244 |
| 6,282,910 | B1 | 9/2001 | Helt | |
| 7,191,607 | B2 | 3/2007 | Curtis | |
| 7,739,882 | B2 | 6/2010 | Evans et al. | |
| 7,946,123 | B2 | 5/2011 | Tolbert, Jr. et al. | |
| 8,493,008 | B2 | 7/2013 | Merkel et al. | |
| 8,766,573 | B2 * | 7/2014 | Becerra | F24F 11/74 |
| | | | | 318/400.09 |
| 8,917,045 | B2 * | 12/2014 | Durfee | G06F 8/60 |
| | | | | 318/490 |
| 9,207,001 | B1 | 12/2015 | Roth et al. | |
| 9,270,221 | B2 * | 2/2016 | Zhao | H02P 25/04 |
| 9,929,681 | B2 | 3/2018 | Yong et al. | |
| 2005/0258789 | A1 * | 11/2005 | Getz | H02P 6/08 |
| | | | | 318/400.02 |
| 2009/0128067 | A1 * | 5/2009 | Mullin | H02K 11/33 |
| | | | | 318/400.01 |
| 2011/0046790 | A1 * | 2/2011 | Miller | F24F 11/77 |
| | | | | 700/276 |
| 2011/0181216 | A1 * | 7/2011 | Bass | H02P 6/28 |
| | | | | 318/400.11 |
| 2011/0254477 | A1 * | 10/2011 | Woodward | F23N 3/082 |
| | | | | 318/400.3 |
| 2011/0260671 | A1 * | 10/2011 | Jeung | H02P 6/08 |
| | | | | 318/701 |
| 2012/0212166 | A1 * | 8/2012 | Merkel | F04D 27/004 |
| | | | | 318/400.08 |
| 2016/0373035 | A1 * | 12/2016 | Yong | H02K 11/28 |

OTHER PUBLICATIONS

Youtube video, QwikSwap X3—Constant Torque EXM Replacement Board. Qwik Products by Mainstream Engineering. Youtube video. Mar. 27, 2015. Retrieved from the internet: <URL: https://www.youtube.com/watch?v=Fhuy0tWIp28>.*
Azure Digi-Motor 2013 Motors & Amatures, Inc., (Brochures).
Rescure Select Motors, OEM Replacement for ECM Furnaces and Air Handlers (Brochures).
OwikSEER+ Theory of Operation and Retrofit Potential, Mainstream Engineering Corporation http://www.gwik.com/products/qwikseer/index.jsp Prepared by Robert P. Scaringe and R. Paul Roth; Mar. 2013.
QwikSwap™ Universal Constant Torque, ECM Blower Motor, An Aftermarket ECM Constant Torque Motor Replacement (Brochure).

* cited by examiner

| Figure 9A LEGEND | |
|---|---|
| 1a | 5 sec delay |
| 2a | PTA0 == 0 (testing mode)? |
| 3a | Save temperature to START_TEMP |
| 4a | Run HIGH Speed |
| 5a | Wait DELAY_RUN |
| 6a | Save Current Temperature to PREV_TEMP |
| 7a | START_TEMP – PREV_TEMP > HIGH_MEDIUM_DELTA OR ADC_Temperature < 50 F? |
| 8a | Set COOL_ON to 0 |
| 9a | Set COOL_ON to 1 |
| 10a | Read Humidity Sensor |
| 11a | ADC_Temperature < 32F OR ADC_Temperature > 140F? |
| 12a | Wait MIN_RUN |
| 13a | RH ≥ 55% and RH ≤ 99.91% |
| 14a | Run MEDIUM speed |
| 15a | COOL_ON = 1? |
| 16a | |PREV_TEMP – Current Temperature| < HIGH_MEDIUM_DELTA? |
| 17a | Run LOW speed |
| 18a | |PREV_TEMP – Current Temperature| < HIGH_LOW_DELTA? |
| 19a | ADC_Temperature <= 24F?* |
| 20a | |Current Temperature – PREV_TEMP| > 20 F? |
| 21a | Has MAX_REOPT_TIME passed since saving temperature to PREV_TEMP? |
| 22a | Brief delay |
| 23a | Read Thermistor |
| 24a | ADC_Temperature > 140F or ADC_Temperature < 24.0F?* |
| 25a | Brief delay, No Speed |
| 26a | Humidity > 98% OR Humidity < 2%? |

FIG. 9B

SIMPLE LOW-COST RETROFIT DEVICE AND METHOD TO REPLACE A VARIABLE AIR FLOW ELECTRONICALLY COMMUTATED MOTOR WITH A PERMANENT SPLIT CAPACITOR MOTOR CAPABLE OF OPERATING AT MULTIPLE SPEED SETTINGS

CROSS-REFERENCE TO RELATED APPLICATION

This application is related to an application entitled "Retrofit Device and Method to Improve Vapor Compression Cooling System Performance by Dynamic Blower Speed Modulation filed by Paul R. Roth et al. on Jun. 29, 2012, now U.S. Pat. No. 9,207,001 issued on Dec. 8, 2015; an application entitled "Retrofit Device and Method to Improve Humidity Control of Vapor Compression Cooling Systems" filed by Paul R. Roth et al. on Jul. 13, 2012, now U.S. Pat. No. 9,417,005 issued on Aug. 16, 2016; and to an application entitled "Elegantly Simple Low-Cost Retrofit Method And Device For Replacing A Constant Torque Electronically Commutated Motor With A Fix-Speed Permanent Split Capacitor Motor" filed by Luke Falls et al., on Feb. 16, 2016 and assigned application Ser. No. 15/044,616, now U.S. Pat. No. 10,605,495 issued on Mar. 31, 2020, the subject matter of all related applications identified above is incorporated by reference herein.

BACKGROUND AND SUMMARY OF THE INVENTION

The present invention relates generally to an elegantly simple, low-cost electronic control board and method to lower the repair costs when, for example, a variable air flow rate Electronically Commutated Motor (ECM) on the indoor air handler blower of an air conditioner or heat pump fails. A more expensive ECM or the like can be replaced with a less expensive Permanent Split Capacitor (PSC) indoor air handler blower motor or the like that has several speed taps connected to the control board.

A fixed speed PSC indoor air handler blower motor of the air conditioner or heat pump is typically manufactured with multiple speed taps that allow the installer to selected one of several possible speeds for the blower to operate when the unit is installed. These motors customarily have three speeds, but some motors have five or more possible speeds; of course, a blower motor can be manufactured with only two speeds as well.

Similarly, a fixed or constant torque ECM indoor air handler blower motor of the air conditioner or heat pump is typically manufactured with multiple torque setting taps that allow one of several possible torques for the blower to operate to be selected when the unit is installed. These motors customarily have five speeds but, of course, can have any number of possible speeds within practical wiring limitations.

A PSC motor is a fixed-speed, asynchronous motor that operates on alternating current. PSC motors used in air conditioner or heat pump indoor air handlers usually have between three and five speed taps as above noted. These speed taps are connection points for electrical power and determine the blower speed. When installing a residential air conditioning system, the HVAC technician selects the blower speed and thus an air flow rate by connecting the power input to one of the speed taps. While the blower motor speed is constant, airflow is not constant because airflow is dictated by both blower speed and pressure drop. That is, the air flow will change as the air filter becomes dirty (increasing pressure drop) or for different installations in which a pressure drop is due to the installation-specific duct work design. Therefore, the ideal blower speed selection for a given system could be different for different installations and also varies with environmental conditions (e.g., less air flow is required when the air is more humid). PSC motors are typically the least expensive and most reliable motor because they do not require the complicated electronics necessary in an ECM.

An ECM is a brushless, direct current (DC) motor with an internal microprocessor that manages commutation, resulting in a higher efficiency. In addition to being more efficient than PSC motors, an ECM results in the ability to also provide variable air flow. That is, the ECM can deliver a variable airflow to optimize conditions even while air filter configuration and cleanliness or ducting geometries change. While a constant torque ECM does provide a near constant air flow rate even while air filter configuration and cleanliness or ducting geometries change, a full variable speed ECM provides the ability to adjust the air flow every time the unit operates. In other words, changes in pressure drop have no effect on the air flow rate of an ECM motor compared to a normal PSC motor running at a single speed. Equipment manufacturers appear to like the ECM because they can be assured of proper air flow over a wider range of ductwork pressure drops (such as installation errors or ductwork design errors), making the performance of their units less susceptible to these difficult-to-predict installation errors.

Variable speed ECM are driven by a Pulse Width Modulated (PWM) signal to the motor drive (located on the back of the motor) to select a particular motor blower flow rate. The selection of the desired speed for given operating conditions is normally programmed by the manufacturer of the air conditioner or heat pump (and not the manufacturer of the motor) to run at a specified typically proprietary operating conditions under different environmental conditions, making it difficult for the repair technician to replace the motor with anything other than an exact replacement. This selection control on the source of the correctly programmed ECM has led to very high prices for these customized replacement motors. Furthermore, because of the large number of manufacturers and the different models and sizes of air conditioning units even from a single manufacturer, it is highly unlikely that a repair technician would have an exact motor replacement at the service site, making return trips to the repair location and delays waiting for these custom parts to arrive inevitable. Many times a repair technician is force to make a costly temporary repair, while waiting for the proper repair parts. There are principally two types of variable air flow blower ECMs used in the HVAC community. The variable speed ECMs denoted as the 2.0, 2.3, and 2.5 series have both a 5-pin connection and a 16-pin connection (FIG. 1), while the ECM 3.0 series uses the same 5-pin connection and a 4-pin connection (FIG. 5). On both configurations, the 5-pin connector supplies 120 VAC or 240 VAC single phase power to the motor at all times, whereas the 16- or 4-pin connector supplies the low-voltage or serial communication to the motor from the air conditioner or heat pump Original Equipment Manufacturer (OEMs) control board. Due to the proprietary nature and differences in the serial communications protocol used by the different OEM, when sending blower motor flow rate commands from the OEM control board to the ECM, and the potential for status commands being sent back to the OEM control from the ECM, as stated earlier, technicians are force to obtain a more expensive exclusive exact OEM replacement motor.

It is well known in the art that increasing the rotational speed of an evaporator blower of a vapor-compression cooling system, or increasing the torque output of the evaporator blower motor increases the air flow rate and reduces the air temperature change for a constant cooling capacity, thereby increasing the operating temperature of the evaporator. An increase in evaporator temperature results in a lower temperature lift, and therefore an increased cooling capacity and/or lower compressor power draw. However, by doing so, the power consumption of the fan increases as well. Therefore, if the increase in temperature and resulting reduction in compressor power draw does not offset the increase in power draw and heat dissipation by the blower used to increase rotational speed of the blower, the net effect is an increase in power consumption and reduction in the Coefficient of Performance (commonly referred to as COPc).

The COPc is the cooling capacity at a particular operating condition (indoor and outdoor wet and dry bulb temperatures) divided by the power consumption at those conditions. The power consumption is mainly comprised of the blower motor power draw, condenser fan power draw, and compressor power draw. Another common term used is Energy Efficiency Rating (or EER). Like COPc, the EER is a ratio of cooling capacity divided by electric power consumed to provide the cooling. However, for the EER calculation, the cooling capacity is measured in units of BTU/hr, and the power input is measured in watts. Although it is not a common engineering practice to have dissimilar units, this EER metric has found wide acceptance and there is a simple conversion which can be calculated by adjusting for the units mismatch, namely EER=3.4 times the COPc. Finally, there is a seasonally adjusted EER which attempts to represent a seasonal average of the EER and is referred to as SEER.

The basic concept that higher evaporator temperature improves cycle efficiency comes from the fundamental Carnot cycle and basic principles of thermodynamics. Higher blower speeds provide more air flow across the evaporator coil, improved heat transfer and a higher coil temperature and therefore reduced thermal lift. Reduced thermal lift means lower compressor work and increased capacity. From a systems perspective, as disclosed in the above cross-referenced patent application, it was recognized that increasing airflow, by increasing motor speed or motor torque or the like (and thus, increasing evaporator saturation temperature) will not always increase system efficiency (COPc) because of the increased blower electrical power consumption at the increased setting. The power input to the blower has a heating effect on supply air, meaning increased blower power draw will have an additional heating effect on the conditioned air (decreasing effective cooling capacity and decreasing the numerator in the COPc calculation) and increases the system power draw (increasing the denominator in the COPc calculation). For COPc to increase due to increased blower airflow, the additional cooling capacity or reduced power consumption from the reduced temperature lift must be more significant than the increased heating effect and power draw realized from increasing blower speed. Whether the COPc is increased or decreased due to increased blower speed is a function of operating point (ambient and return air conditions), system design, blower type, ducting, and air filter selection and filter cleanliness It was previously found that by merely using the evaporator saturation temperature, or another variable which parallels that temperature, such as evaporator pressure, evaporator surface temperature, or evaporator air discharge temperature, the evaporator blower fixed operating setting (namely motor speed or motor torque, or the like) can be altered to reduce overall power consumption and thereby to improve COPc, EER, and SEER in a totally unanticipated and surprising manner. That is, by simply monitoring the evaporator temperature, initially at high speed, the blower setting (speed, or torque or power consumption, or the like) can be lowered and energy saved as long as there is not an appreciable change in the evaporator temperature. Put another way, if lowering the blower setting does not appreciably change the evaporator temperature, then the new lower setting is used, otherwise the blower is returned to the higher setting; and this test can be repeated for as many possible motor settings that are available and repeated as often as desired.

Mainstream Engineering Corporation, the assignee of the present application, has in the past developed and marketed retrofit boards to achieve a variety of performance-enhancing purposes. For example, above-referenced U.S. Pat. No. 9,207,001 discloses such a control board that reduces an evaporator blower's speed as long as there is a negligible change in the compressor's power compensation so as to obtain a net increase in COPc. This product is marketed under Mainstream Engineering's trademark "QwikSEER.+®"

The "QwikSEER+®" control reduces the power draw of an AC or heat pump by modulating evaporator airflow. On air conditioning or heat pump systems with traditional analog thermostats, the QwikSEER+® control board automatically selects the blower speed from one of the possible PSC motor speeds. For PSC blower motors, changes in the system pressure drop, caused by such things as a dirty air filter, will make a more dramatic change to the airflow. Unlike typical digital thermostat variable speed system installations, which have complicated and costly ECM motor power electronics, Mainstream's QwikSEER+® blower control module automatically accounts for changing installation and environmental conditions each time the cooling mode is activated and does so with a lower-cost PSC motor configuration. QwikSEER+® control board uses simple relays to turn a reliable, inexpensive fixed-speed PSC motor into a three-speed motor, yielding much of the benefit provided by a variable-speed ECM motor (which optimizes airflow with environmental changes) at a fraction of the cost and with potentially improved reliability. When the system starts in cooling mode, QwikSEER+® operates the PSC blower motor in different speeds, compares system operating conditions for the different fan speeds, and determines the optimal fan speed to maximize performance. This flexibility allows QwikSEER+® to optimize air handler blower speed while accounting for all system conditions: outdoor air temperature, indoor air temperature and humidity, supply ducting restrictions, and air filter type and status. Unlike a variable-speed ECM motor with a digital thermostat, QwikSEER+® does not have complicated digital control electronics or complicated power electronics, which can increase and potentially lower the reliability. QwikSEER+s can be installed in an existing system with a PSC motor and analog thermostat to enhance efficiency and humidity removal. QwikSEER+® along with a PSC motor can also be installed in any system with a failed ECM or other motor that uses an analog thermostat but the installer would have to rewire the system to create a low-voltage output to activate the QwikSEER+® control board. For example, QwikSEER+® literature has stated that "if a homeowner has a blown Constant-Torque style ECM motor such as an X-13 motor, the technician can add a contactor to be activated by the thermostats Green and Common low voltage controls wires and then run power leads from the QwikSEER+® board to the PSC motor." If the system was used for both heating and cooling, then two contactors would be needed to isolate the two circuits, to avoid back-feeding of the heating control circuit from the blower activation control voltage being supplied. Once sales of QwikSEER+® began, Mainstream Engineering Corporation came to realize that a technical understanding of the way to properly rewire the low-voltage control circuit and to prevent back-feeding was either beyond most technicians' understanding or technicians were unwilling to spend the time necessary to perform this rewiring on a service call. This approach also required the installer to identify the high voltage power leads and ground lead on the ECM motor connector and rewire these power leads and ground to the QwikSEER+® control board.

More recently, to avoid the need for the installer to rewire the control circuit, and the power circuit while also avoiding the electrical back feeding issue which became a common issue during field rewiring of the control board by many technicians, Mainstream began marketing under its trademark QwikSWAP™ which is a retrofittable control board to replace a failed constant torque ECM with a PSC motor using the speed optimization logic of the QwikSEER+® patent while avoiding the need for any circuit rewiring. The QwikSWAP™ control has the advantage over the earlier QwikSEER+® approach when replacing a failed ECM motor because now it is only necessary to move the constant torque ECM power and control circuit leads from the universal connection on the failed ECM to the QwikSWAP™ board and then run the power leads from that board to the PCS motor and install a capacitor. It is not necessary to add contactors to the existing circuitry or even understand the existing circuitry. This greatly simplifies the replacement of the constant torque ECM motor since it avoids any complex or major circuit rewiring to activate the control board and the PSC motor. Both QwikSEER+® and QwikSWAP™ boards control the speed of a PSC motor in the exact same way to optimize efficiency, reduce energy consumption, and dramatically improve humidity removal. They also both have an optional humidity sensor to further improve humidity removal. The difference between these two products is mainly one of installation ease. With QwikSEER+®, if a homeowner has a blown constant-torque style ECM, the technician must add at least one contactor to be activated by the thermostat's Green and Common low voltage control wires, run line power directly from the molded plug connected to the ECM motor being replaced (or from some other power source) to the QwikSEER+® board, and then run the power leads from the QwikSEER+® board to the PSC motor and wire in a capacitor. Using a QwikSwap™ control board instead of the QwikSEER+® board simplifies the installation, because it is only necessary to move all the constant torque ECM leads (power and control wires) from the universal connection on the blown ECM to the QwikSwap™ board and then run the power leads from the QwikSwap™ board to a PSC motor and wire in a capacitor. QwikSwap™ saves time and money while also reducing the need to add one or more contactors.

We have also now recognized that monitoring of the change in evaporator temperature can be used to adjust motor settings and determine the ideal blower setting when replacing a OEM-programmed ECM or the like with a generic constant torque ECM, a less expensive PSC motor or the like and still obtain an energy savings derived from variable air flow rate operation. That is, the benefit of the variable air flow rate can be achieved without the need to understand the proprietary or assorted possible OEM specific air flow rate commands being sent from the OEM control board to the ECM via the low-voltage 4-pin or 16-pin serial communications port to the ECM. Instead a generic constant torque ECM with multiple torque setting taps, a generic PSC motor with multiple speed taps or any motor with multiple connection speed or torque taps (or any motor with the ability to run at different speed, torque or air flow rate settings) can be used with the air flow rate control logic described herein to determine the optimized air flow and activate a replacement motor to operate to provide that flow rate, while ignoring the flow rate commands provided by the OEM in their potentially unknown or diverse command strings being sent between the OEM control board and the ECM. This allows a universal replacement control board to be used with a less expensive motor as a viable replacement, and removes the requirement to have a wide assortment of different OEM motors on hand.

The present invention determines the best air flow rate and achieves this flow rate by controlling the electrical power being sent to various electrical taps on the multi-tap motor which vary either speed, torque or the like, to provide different air flow rates that best match the situation.

We have further recognized that monitoring of the change in evaporator temperature can also be used to adjust blower motor speed and determine the ideal blower setting when replacing a variable air flow rate ECM or the like with a less expensive PSC or constant torque ECM motor or the like and still obtain financial savings. The benefit of variable air flow rate can be achieved by using the simpler, less expensive motor (with multiple speed or torque taps) and the automatic selection of the motor speed or torque tap that allows the lowest possible motor speed that still provides a negligible change in evaporator temperature when the unit is operated.

As stated above, the basic concept that higher evaporator temperature improves cycle efficiency comes from the fundamental Carnot cycle and basic principles of thermodynamics. For example, U.S. Pat. No. 5,303,561 (col. 2, lines 13 et seq.) states that "this is due to the fact that a highly efficient air-conditioning system nominally operates at higher evaporator coil temperature . . . ." A continually variable fan is employed to modulate the fan speed using a "integrated drive and variable speed motor" (col. 6, lines 21-22), and this approach in one form or another has been used along with complex control logic to establish the optimal fans speed for the desired temperature and humidity in the building using a combination of indoor air temperature, indoor air humidity and outdoor air temperature for selecting the indoor evaporator blower speed.

Likewise, U.S. Pat. No. 6,282,910 describes using an AC induction blower motor along with a variable speed drive, where alternating current power is directly coupled to the motor at nominal line frequency for full speed operation, or an inverter output is used to alter blower speed when reduced blower speed is desired. Although the existing alternating current (AC) induction motor is used, a continuously variable speed drive inverter is required to vary the motor speed.

Others have proposed modulating the compressor speed (see, e.g., U.S. Pat. No. 7,946,123), but these known approaches also required variable speed drive inverters or different compressors to implement in a retrofit configuration that is both costly and impractical. U.S. Pat. No. 7,739,882 also discloses a variable speed control system for use with a variable speed compressor. Calibration techniques have been developed for calibrating and controlling variable speed motors as shown, for example, in U.S. Pat. No. 4,860,231 which discloses a technique to determine the ECM settings to achieve a desired predetermined constant air flow rate (CFM) for the blower motor. The load torque acting on the blower wheel is determined by way of a "coast down" procedure in which the motor is briefly de-energized and the rate of angular change is determined. The load torque acting of the blower wheel can be then determined using the moment of inertial and the rate of angular change. The average motor RPM is then related to a torque value when an RPM vs. CFM relationship has been predetermined for the specific blower wheel. A microprocessor then computes the final motor RPM necessary to achieve a desired air delivery CFM using the fan law equations.

A goal of the present invention is to provide a universal blower motor replacement, that is a motor that is completely independent of a specific OEM programming, or low voltage serial communication, while maintaining the advantages of variable air flow and lowering the replacement equipment cost. This is accomplished by employing a commonly available PSC blower motor or the like instead of a unknown proprietary custom programmed variable air flow rate OEM replacement motor.

Significantly, the present invention uses the existing multi-speed selection capability of fixed speed air handler blower motors such as a PCS motor combined with proper selection of the speed to use, depending on the evaporator temperature change, to provide a more efficient and lower cost alternative to replacing a failed variable air flow rate ECM blower motor with another such blower motor. Fixed-speed PSC blower motors typically have several different winding combinations (and different electrical connection points or speed taps) that give the HVAC installer the ability to select from an assortment of fixed speeds from the same blower motor (depending on the speed tap that is activated), to best balance the air flow for a particular installation. Similarly, constant torque ECM motors typically have several different electrical connection points that give the HVAC installer the ability to select from an assortment of fixed torques from the same blower motor (depending on the torque tap that is activated), to best balance the air flow for a particular installation. In a normal application, once the speed (or torque) is selected for a particular operating mode (cooling or heating), the air handler blower operates at this setting whenever the motor is activated. Typical air handler PSC blower motors have three to five speeds as mentioned above. Blower speed is typically selected by placing the power-leads on the quick-disconnect post that correlates to the desired blower speed or connecting the power-leads to specific electrical wires originating from the motor and these wires are differentiated by color. Once a speed is selected, the air handler blower will operate at the selected speed whenever it is powered in that mode. While some systems allow for a single fixed speed in cooling mode and a potentially different speed in heating mode, once heating or cooling operation is selected, the indoor coil's blower motor normally operates at a fixed speed determined by the technician who installed or maintains the system. Instead, the present invention uses at least two of the existing multi-speed blower motor taps to provide dynamic air flow rate adjustment by powering different motor power taps, such as powering different variable motor speed adjustments during air conditioning operation, based on a single input such as evaporator saturation temperature, evaporator saturation pressure, evaporator outlet air temperature or evaporator surface temperature.

One of ordinary skill in the art will also understand that for heat pump applications, where the same indoor blower motor is now blowing air across the indoor coil which is functioning as a condenser in the heating mode, the same temperature sensor or the like is measuring condenser saturation temperature and can provide dynamic speed variation, this time for the condenser cooling to improve overall performance in heating mode using the same device, with the only modification being to use the increase in temperature of the condenser coil or condenser exit air temperature. To accommodate situations where the coil behaves as both an evaporator in cooling and a condenser in heating mode the absolute temperature difference, that is only the magnitude of the change in the temperature, can be used.

U.S. Pat. No. 7,191,607 discloses a speed control that selectively operates the fixed speed blower motor to slow the speed of the blower for dehumidification but only in the initial stages of the cooling mode, typically the first 5 to 7 minutes. This approach did not, however, recognize that blower speed should be modified to improve system efficiency, and that such blower speed modulation could be easily achieved by actuating different motor windings to produce higher performance with substantially less complexity.

The present invention uses the exact opposite control logic on start-up when compared to the approach in the above-described U.S. Pat. No. 7,191,607. In the present invention, when the air conditioner is started and the evaporator blower is activated, the blower speed is set to maximum speed for the initial startup rather than a slow speed in order to determine the highest possible evaporator operating temperature as the initial baseline, from which the effect of slower evaporator blower (fan) speeds on evaporator temperature can be determined.

Our invention produces lower overall energy consumption by lowering the air flow (blower fan power draw), for those situations when no significant increase in compressor power is observed (as determined by a significant decrease in evaporator temperature or increase in condenser temperature) due to the lower air flow across the specific heat exchanger coil. A lower blower speed without an increase in compressor power results in a reduction in overall power consumption, and therefore a boost in performance (COPc, EER, or SEER). That is, a lower evaporator blower speed does not result in significant decrease in evaporator saturation temperature and/or a lower condenser fan speed (heat pump in heating mode, the condenser fan speed is the indoor blower motor speed) does not result in a significant increase in condenser saturation temperature. A further benefit of the present invention is simple installation, and the ability to use a less expensive blower motor to reduce cost and still retain the variable air flow capability to improve performance (improve COPc, EER or SEER when compared to fixed speed operation). An additional benefit of the present invention is simple repair installation when an installer must replace a failed variable air flow ECM blower motor because the installer does not need to use a specific preprogramed motor supplied by the OEM with the OEM's proprietary blower motor control algorithm. This is because the proposed invention need only detect a control signal solely for the purpose of determining that the blower motor should be operating, but need not interpret the control command to determine the proper motor speed to optimize the air flow rate. Rather the replacement blower motor setting is optimized for the conditions each time the unit is operated.

As previously stated, our novel approach can, of course, also be extended to condenser fan speed, where the condenser fan speed is lowered when no appreciable increase in compressor power occurs (i.e., no appreciable increase in condenser temperature) as a result of the lower condenser fan speed, notwithstanding the fact that condenser fans with multiple speed taps are not common in existing air conditioning systems. However, as one skilled in the art will understand that, for heat pump systems operating in heating mode, the condenser is the indoor coil (and the evaporator is the outdoor coil), so for a heat pump operating in heating mode, the indoor blower motor is the condenser fan and therefore multiple speed fan motors are possible.

The present invention is elegantly simple in its ability to provide significant improvements in performance (COPc, EER and SEER) while replacing a specific OEM uniquely programmed variable air flow ECM without having to determine the OEM specific motor programming or unique communications protocol between the OEM Control Board and the variable air flow ECM. The present invention is also elegantly simple in its ability to maintain the benefits in performance (COPc, EER and SEER) as a result of variable air flow, while replacing an specific OEM uniquely programmed variable air flow ECM with a lower-cost PSC motor while still achieving energy savings due to the variable flow adjustment caused by proper selection of the best PSC (or similar motor with multiple speed, torque, or flow rate motor taps) motor speed tap. The motor change is accomplished without replacing the existing thermostat-based control system, without replacing the OEMs control board, without understanding the specific OEM's proprietary communication protocol (between the OEM control board and motor) and without adding a complex, costly and large inverter or alternative speed controller system. Due to its simplicity, the present invention can be easily and quickly retrofitted into exiting air conditioning and heat pump cooling systems in the form of a control board and a PSC motor (or constant torque ECM motor with multiple torque tap settings) to replace the existing variable air flow rate ECM. Of course, the present invention can be easily and quickly retrofitted into exiting air conditioning and heat pump cooling systems in the form of a blower motor control board and a new or existing motor (capable of operating at different speeds, torques, or flow rates by activating different motor electrical taps) and the invention will determine the optimum electrical tap to activate, thereby reducing power consumption and increasing COPc, EER, SEER and the like when compared to fixed speed operation. Rather than operate the indoor air handler blower at a single speed, the present invention varies the motor speed, thereby varying the airflow to optimize operating conditions with a low cost motor instead of using a far more expensive variable air flow rate ECM. One skilled in the art will understand that if the replacement motor is a constant torque motor with multiple torque setting taps rather than a constant speed PSC motor with multiple speed taps, the present invention can vary the torque of the motor, thereby varying the airflow to optimize operating conditions in the same manner. Because of the current higher cost of the ECM, the lower cost PSC motor is the better cost option, and the currently preferred embodiment, but this can change as motor costs change and other motor types with multiple air flow rate capabilities emerge.

More specifically, one embodiment of the invention uses a single electronic control board to provide the variable air flow rate. This board is located either inside or outside the air handler, within practical reach to the blower motor (indoor air handler motor). The control board can be powered and controlled by the line voltage and control voltage signals that were originally connected to, say, an original OEM variable air flow rate ECM. As stated earlier, the HVAC variable air flow blower ECMs have only two possible electrical connections as shown in FIGS. 1 and 5. Both have the same 5-pin 120 VAC or 240 VAC single phase electrical connections and one configuration (FIG. 1) uses a 16-pin low voltage serial communication connection while the other configuration (FIG. 5) uses a 4-pin low voltage serial communication connection.

In one currently preferred embodiment of the invention, a blower ECM characteristically has a 120/240 VAC single-phase connection pattern and the 16-pin low-voltage serial communication control connections. To simplify retrofit wiring, a control board of the present invention has the same 5-pin 120/240 VAC (2) and 16-pin low voltage electrical connection pattern located directly on the control board. The control board has five 120/240 VAC single-phase electrical connections of the typical variable air flow rate ECM consisting of the two line voltage connections and 120/240 VAC operation selection jumper, and earth ground as well as 16 low-voltage connections which include: proprietary OEM serial communications, pulse width modulation (PWM) input, motor tachometer output, discrete thermostat control inputs, and pre-programmed motor speed function inputs. Normally, the cooling and heating blower motor air flow rate settings for the variable air flow rate ECM are determined by signals on one or more pins of the 16-pin low-voltage communication connection. In addition, the control board of the present invention uses two connections (two wires) to a device to measure temperature such as a thermistor, thermocouple, RTD or the like to measure evaporator surface temperature (sensor input). Evaporator saturation pressure, saturation temperature or outlet air can be measured instead of the evaporator surface temperature. All the input power and control connections are removed from the variable air flow rate ECM being replaced and attached to the corresponding locations on the control board of the present invention, and the temperature sensor is attached to the surface of the indoor coil (evaporator in cooling, condenser for heat pump in heating mode). The sensor is preferably located in a region of the evaporator that should contain saturated refrigerant such as in the region of the evaporator directly downstream of the expansion device. The PSC motor is also connected to a capacitor and sized for the particular horsepower of the PSC motor being used.

In a second currently preferred embodiment of the invention, a blower ECM characteristically has the 120/240 VAC single-phase connection pattern and the 4-pin low-voltage serial communication control connections. To simplify retrofit wiring, the control board in this embodiment of the present invention has the 120/240 VAC connection and 4-pin low voltage serial communications connection electrical connection pattern located directly on the control board. The control board has the five 120/240 VAC single phase electrical connections of the typical variable air flow rate ECM consisting of two line voltage connections, earth ground, optional jumper for 120 VAC operation option as well as four low-voltage serial communication connections consisting of low voltage supply voltage, serial transmit data, serial receive data, and return or low voltage ground. Normally, the cooling and heating blower motor air flow rate settings for the variable air flow rate ECM are determined by proprietary signals on one or more pins of the 4-pin low-voltage communication connection. In addition, the control board of this embodiment of the present invention again uses two connections (two wires) to a device to measure temperature such as a thermistor, thermocouple, RTD or the like to measure evaporator surface temperature (sensor input). Evaporator saturation pressure, saturation temperature or outlet air can be measured instead of the evaporator surface temperature. All the input power and control connections are removed from the ECM being replaced and attached to the corresponding locations on the control board, and the temperature sensor is attached to the surface of the indoor coil (evaporator in cooling, condenser for heat pump in heating mode). The sensor is preferably located in a region of the evaporator that should contain saturated refrigerant such as in the region of the evaporator directly downstream of the expansion device. The PSC motor is also connected to a capacitor and sized for the particular horsepower of the PSC motor being used. It is also understood that the 16 pin and 4 pin OEM proprietary communication connections of the two different embodiments of the present inventions could be located on a single board.

The control board embodiments of the present invention have outputs which are connected to three speed taps of the blower motor and the common power connection. (Alternatively, the control board could have multiple torque taps that are connected to the torque taps on a Constant Torque ECM.) The High Speed power lead is connected to the high-speed post of the multi-tap motor, the Medium-Speed power lead is connected to the medium-speed post of the multi-tap motor, and the Low-Speed power lead is connected to the low speed post of the multi-tap blower motor. The common power lead is connected to the common tap of the blower motor. The control board of our currently preferred embodiments of the present invention are powered by scavenging power from the 5-pin input power leads that are connect to the control board. If the replacement blower motor has more than three speeds, then the High-Speed tap of these embodiments of the present invention (which has been configured to provide three control speeds) is connected to the highest speed tap, the Low-Speed tap is connected to the lowest speed tap and the Medium-Speed tap is connected to one of the speeds nearest the middle speed of that motor. If the motor only has two speeds, then both the Low- and Medium-speed taps are connected to the slower of the two speeds. The remainder of the air conditioning or heat pump control system is unchanged.

In a typical air conditioning or heat pump applications, when the thermostat on the air conditioning or heat pump system calls for cooling, power is supplied to the compressor(s), the condenser fan(s) and the evaporator blower(s) and one or more control signals from the thermostat are used to activate the system. In the currently preferred embodiment, the replacement PSC blower motor is activated by any signal that had been detected on the 16- or 4-pin low-voltage serial communications connection of the ECM and is now connected to the control board of the present invention. Likewise, when the thermostat is calling for heating, a 24 VAC heating control signal is also rerouted from the ECM connector to the control board of the present invention.

A goal of the present invention is to provide a universal blower motor replacement that is a motor that is completely independent of a specific OEM's proprietary programming or low voltage serial communication protocol, while maintaining the advantages of variable air flow and lower the replacement equipment cost. This is done by employing a commonly available PSC blower motor or the like instead of a custom proprietary programmed variable air flow OEM replacement motor.

We have also recognized that monitoring of the change in evaporator temperature can be used to adjust blower motor speed and determine the ideal blower air flow setting when replacing a variable air flow rate ECM or the like with a less expensive motor like the PSC motor and still obtain variable air flow rate adjustment as well as a financial and time savings. That is, the benefit of the variable air flow ECM, namely its ability to provide variable air flow rates to suit environmental conditions over a range of system ductwork air pressure drops—thus making it relatively insensitive to ductwork sizes, filter types and filter cleanness—can be achieved by using a simpler, less expensive motor with multiple speed taps (or torque taps) and the selection of the motor speed tap that allows the lowest possible motor speed that still provides a negligible change in evaporator temperature.

Our invention can also use a replacement PSC motor with several speed taps or a replacement constant torque ECM with several torque taps, or any type of replacement motor where the selection of different wiring connections or different connection taps, results in different air flows, that is different air flow rates created, by the blower motor.

BRIEF DESCRIPTION OF THE DRAWINGS

These and other features, advantages and objects of the present invention will become more readily apparent from the following detailed description when taken in conjunction with the accompanying drawings wherein:

FIGS. 9A and 9B are, respectively, a control logic diagram and the legend sheet for the items in FIG. 9A showing how the present invention is usable for a heat pump or air conditioning cooling unit, where the indoor blower PSC motor speed is varied from High, Medium or Low speed, as the indoor unit is an evaporator (cooling mode) or the indoor unit is a condenser (in heating mode).

DETAILED DESCRIPTION OF THE DRAWINGS

Figure 1:
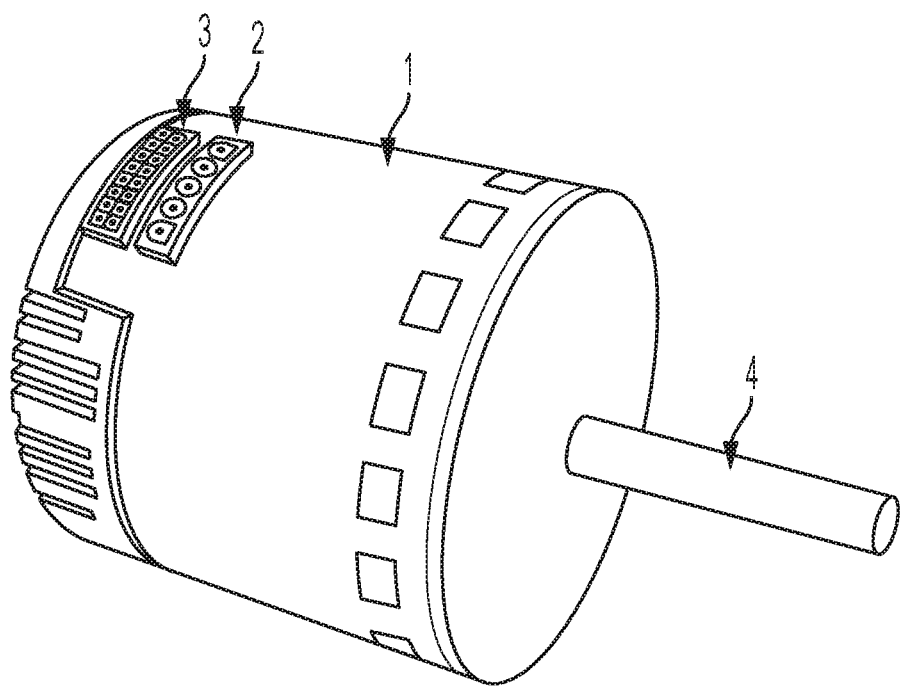
FIG. 1 is a schematic perspective view showing a prior art ECM with the standard 5-pin power lead 120/240 VAC single-phase electrical connection, standard 16-pin low-voltage control lead connection and drive shaft.

FIG. 1 shows the standard electrical connections on a variable air flow rate ECM (1) with the standard 5-pin power lead 120/240 VAC single phase ECM motor power connection (2), 16-pin low-voltage control lead connection (3) and drive shaft (4) which is connected to the blower.

Figure 2:
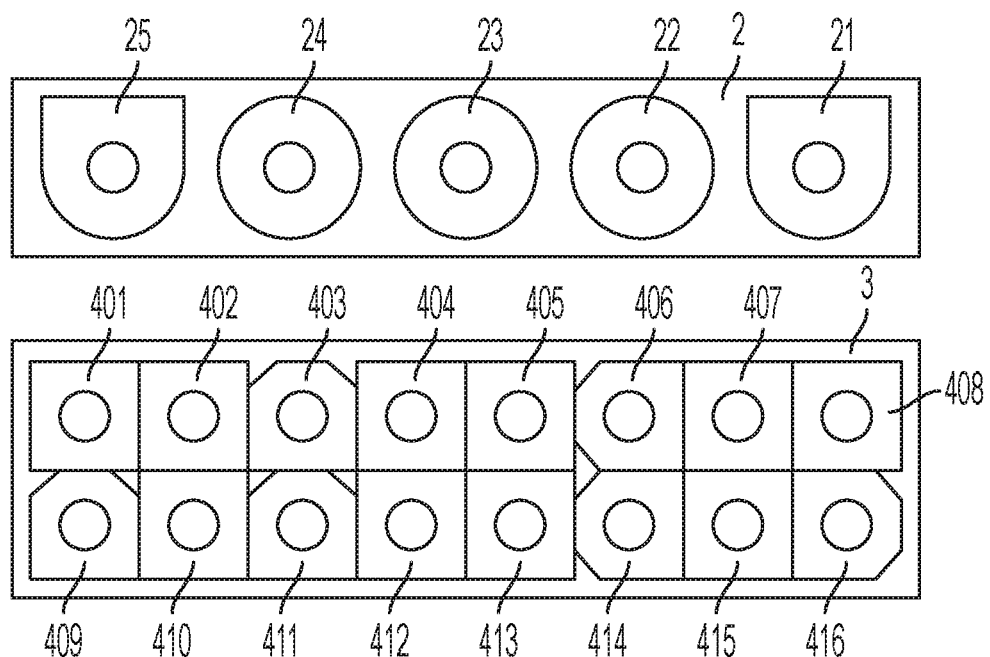
FIG. 2 is a detailed diagram showing a larger view of the prior art standard electrical connections used on one type of common variable air flow rate blower ECM shown in FIG. 1.

FIG. 2 is a larger view of the standard 5-pin power lead 120/240 VAC electrical connection (2) used on all variable air flow rate blower ECMs, and 16-pin low voltage control lead connection (3). On the higher voltage electrical power lead connection 2, numerals (21)-(25) respectively represent 120/240 VAC Line (21), 120/240 VAC Neutral (22), Earth Ground (23), Optional Jumper (24) & (25) for selecting 120 VAC operation option. On the low voltage control lead connection (3), connections (401)-(416) represent 24 VAC C1/GROUND (401), W/W1 (402), 24 VAC C2 (403), DELAY (404), COOL (405), Y1 (406), ADJUST/+12 VDC (407), TACH OUT- (408), O (409), BK/PWM/Serial RX (410), HEAT (411), 24 VAC R (412), EM/W2 (413), Y/Y2 (414), G (415), and TACH OUT+/Serial TX (416).

Figure 3:
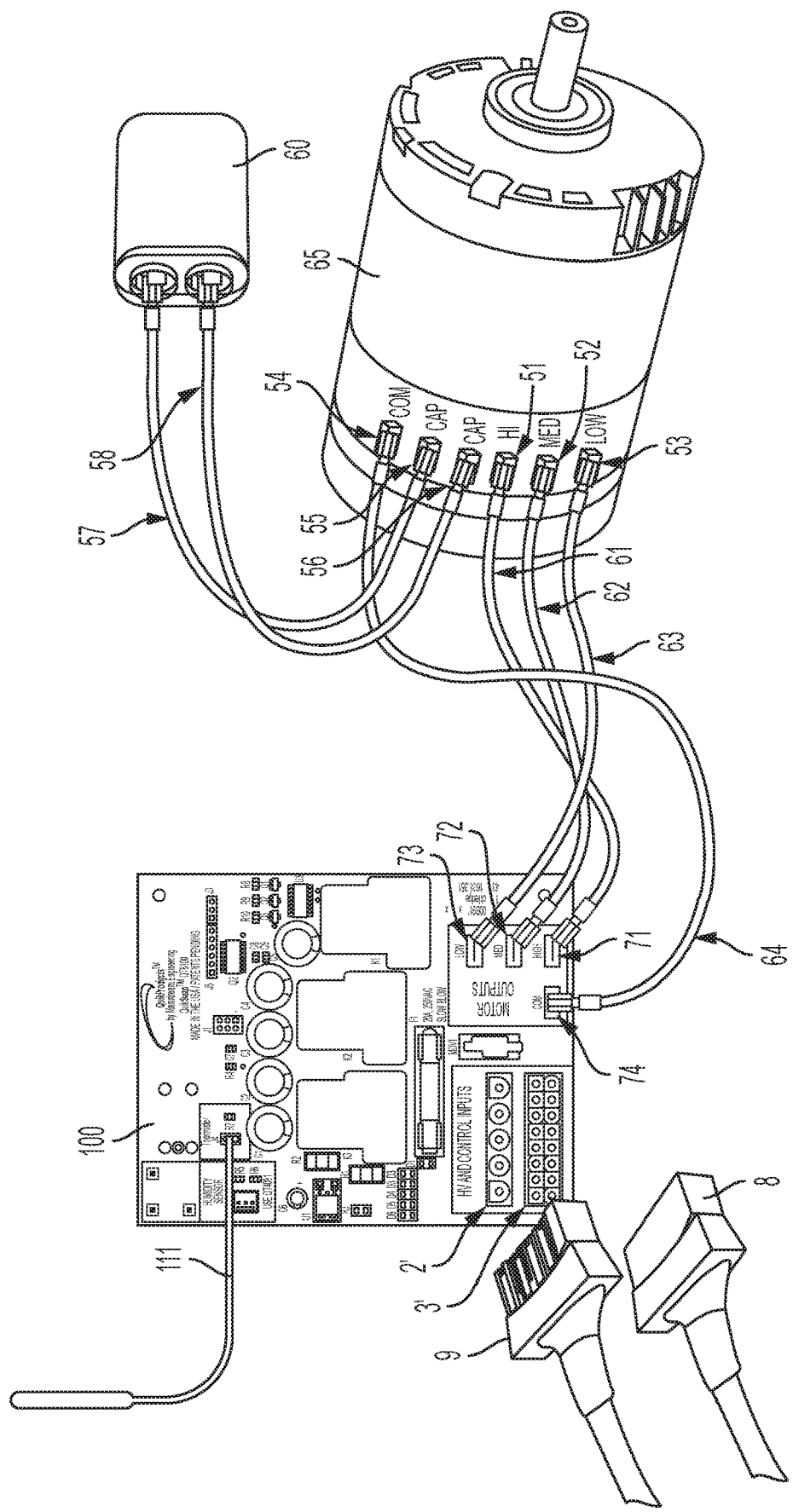
FIG. 3 is a wiring connection diagram showing the control board and the location of the connections for the wires from the ECM and the location of the wires going to the PSC motor from a three-speed control board for PSC evaporator blower speed control according to one embodiment of the present invention.

FIG. 3 is a diagram showing the how the control board (100) of the present invention and the PSC motor (65) are connected. The 5-pin power lead connector (9) is removed from the ECM being replaced and is inserted into the 5-pin power lead connection (2') on the control board (100). Similarly, the 16-pin control lead connector (8) is removed from the ECM being replaced and inserted into the 16-pin control lead connection (3') on the control board (100). The PSC motor (65) which is replacing the ECM, is wired to the control board (100) by routing a common wire (64) from the common post (74) of the control board (100) to the common post (54) of the PSC motor (65). Similarly, a wire (61) connects the high speed tap (71) of the control board (100) to the high speed tap (51) of the PSC motor (65), a wire (62) connects the medium speed tap (72) of the control board (100) to the medium speed tap (52) of the PSC motor (65), and a wire (63) connects the low speed tap (73) of the control board (100) to the low speed tap (53) of the PSC motor (65). Two wires (57, 58) connected to the capacitor (60) connect the capacitor (60) to two CAP posts (55, 56) on the PSC motor (65).

Figure 4:
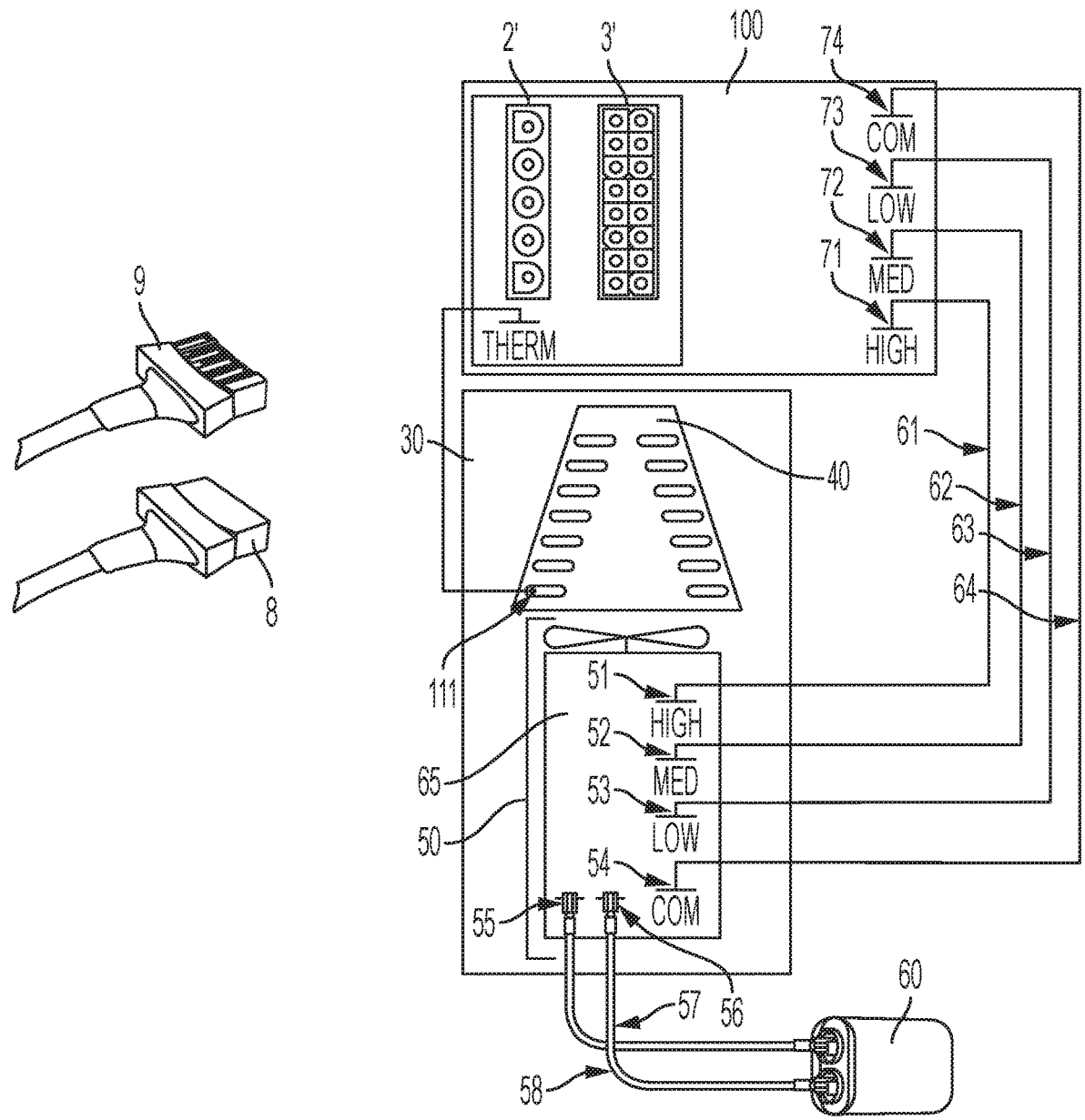
FIG. 4 schematically shows one contemplated implementation of the embodiment of the control board shown in FIG. 3 when retrofitted on the indoor air handler of a heat pump or air conditioning system.

FIG. 4 schematically shows one contemplated implementation of a currently preferred embodiment of the proposed control board or device (100) when retrofitted on the air handler (30) of a heat pump or air conditioning system having multiple of speed tabs (50). The 5-pin power lead connector (9) and 16-pin control lead connector (8) normally connected to the standard ECM connection are moved to like locations on the control board (100). That is, the 5-pin power lead connector (9) is removed from ECM connection (2) and installed on the 5-pin power connection (2') on control board (100). The 16-pin control lead connector (8) is removed from ECM connection (3) and installed on the 16-pin control lead connection (3') on control board (100). The thermistor (111) is attached to the saturated section of the indoor coil (40) of the indoor air handler (30). The activation of specific leads in the 16-pin connector or the type of signal produced is originally determined by the specific proprietary programming used by each particular system manufacturer when using the original ECM that is being replaced.

Figure 5:
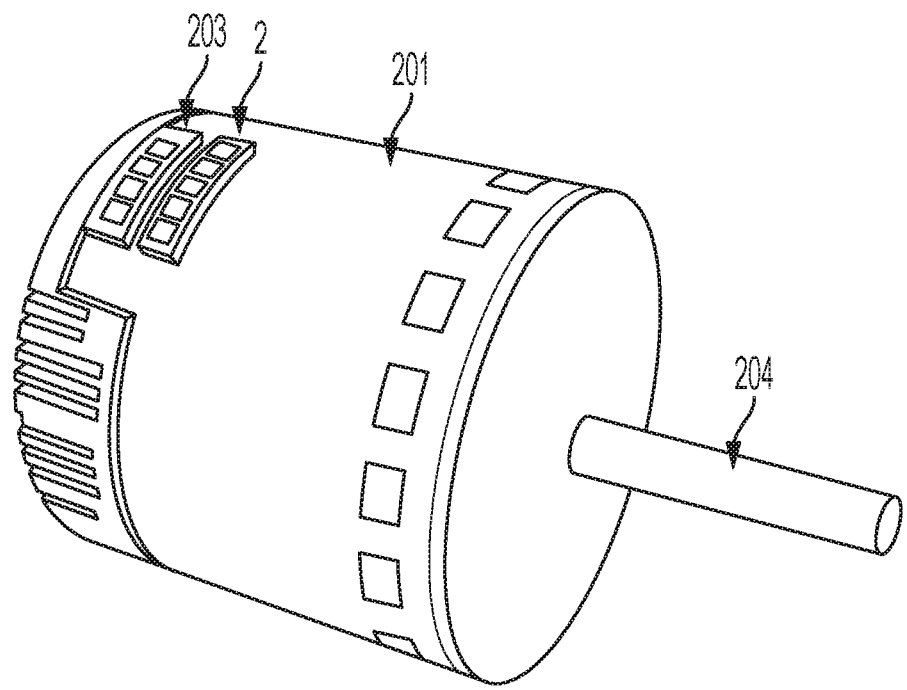
FIG. 5 is a schematic perspective view showing prior art ECM with the standard 5-pin 120/240 VAC single-phase electrical connection, standard 4-pin low-voltage control lead connection and drive shaft.

FIG. 5 shows the standard electrical connections on another HVAC variable air flow rate ECM (201) with the standard 5-pin power lead 120/240 VAC single-phase ECM power connection (2), 4-pin low-voltage control lead connection (203) and drive shaft (204) which is connected to the blower motor (201).

Figure 6:
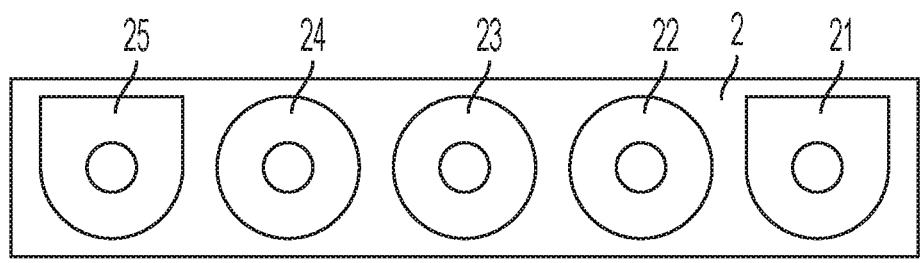
FIG. 6 is a detailed diagram showing a larger view of the prior art standard electrical connections used on one type of common variable air flow rate blower ECM shown in FIG. 5.
Figure 6:
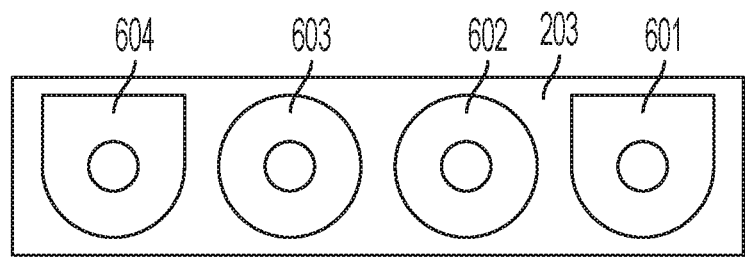

FIG. 6 is a larger view of the standard 5 pin power lead 120/240 VAC electrical connection (2) used on all variable air flow rate ECM blower motors, and 4 pin low voltage control lead connection (203). The pin outs for the 120/240 high voltage connector are the same as discussed in relation to FIG. 2. However, for the low voltage control lead connection (203) connections (601)-(604) represent Low Voltage Power (601), Serial Transmit TX (602), Serial Receive RX (603), Low Voltage Ground (604).

Figure 7:
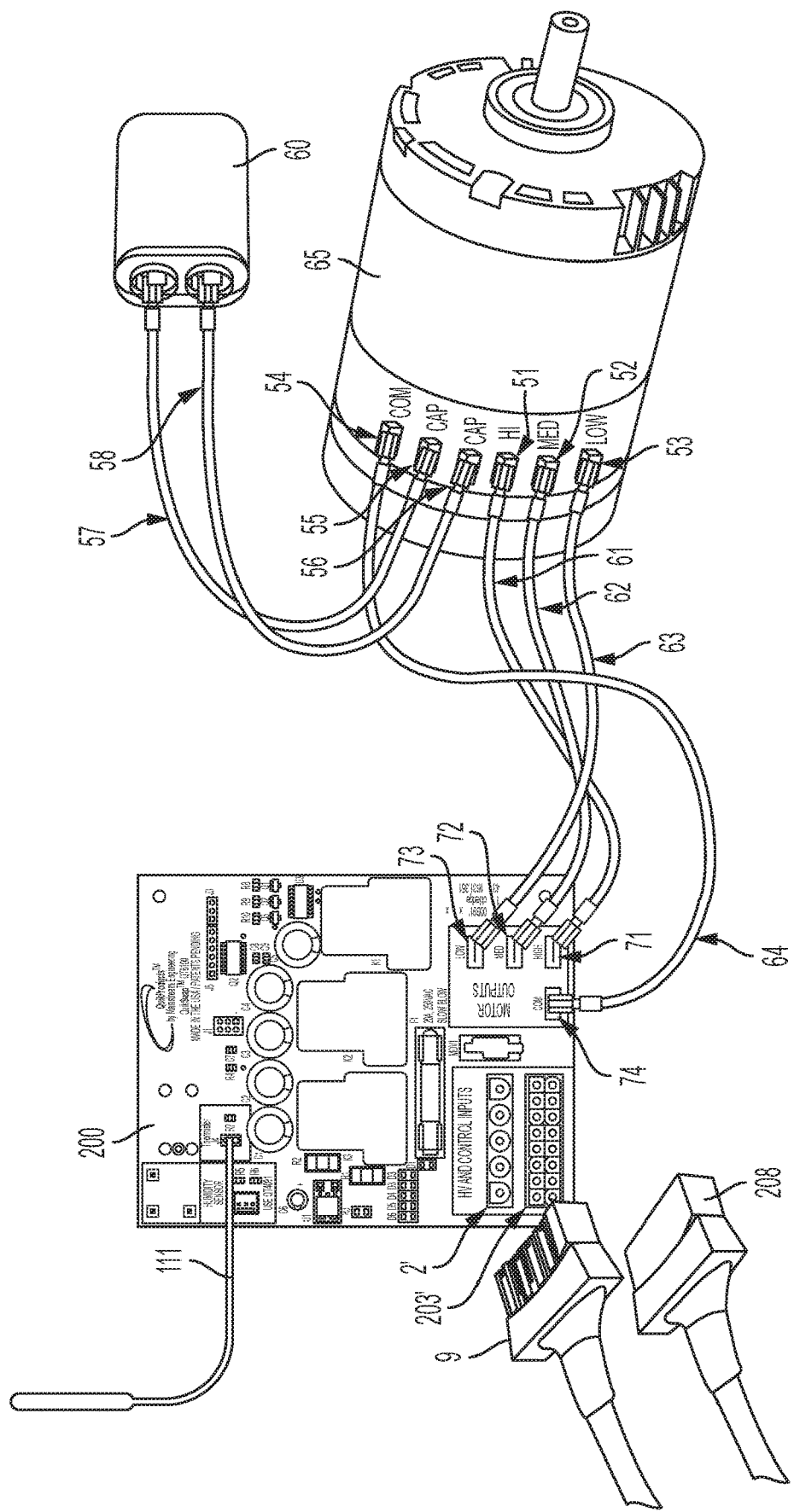
FIG. 7 is a wiring connection diagram showing the control board and the location of the connections for the wires from the ECM and the location of the wires going to the PSC motor from the three-speed control board for PSC evaporator blower speed control according to another embodiment of the present invention.

FIG. 7 shows how the control board (200) and PSC motor (65) are connected. The 5-pin power lead connector (9) is removed from the ECM being replaced and is inserted into the power lead connection (2') on the control board (200). Similarly, the 4-pin control lead connector (208) is removed from the ECM motor being replaced and is inserted into the control lead connection (203') on the control board (200). The PSC motor (65) which is replacing the ECM is wired to the control board (200) by routing a common wire (64) from the common post (74) of the control board (200) to the common post (54) of the PSC motor (65). Similarly, a wire (61) connects the high speed tap (71) of the control board (200) to the high speed tap (51) of the PSC motor (65), a wire (62) connects the medium speed tap (72) of the control board (200) to the medium speed tap (52) of the PSC motor (65), and a wire (63) connects the low speed tap (73) of the control board (200) to the low speed tap (53) of the PSC motor (65). Two wires (57, 58) connected to the capacitor (60) connect the capacitor (60) to two CAP posts (55, 56) on the PSC motor (65).

Figure 8:
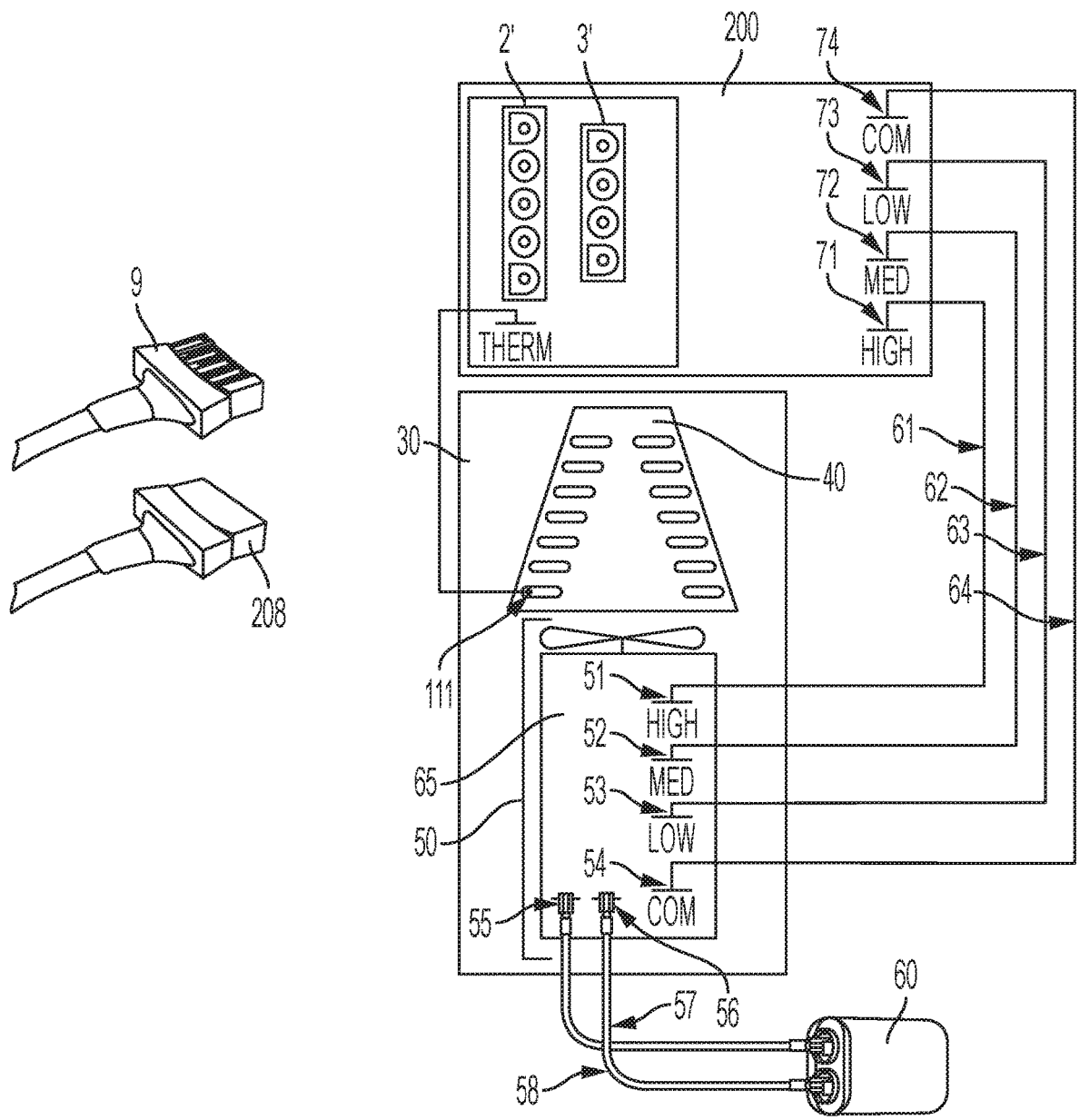
FIG. 8 schematically shows one contemplated implementation of a preferred embodiment of the control board or device shown in FIG. 7 when retrofitted on the indoor air handler of a heat pump or air conditioning system.

FIG. 8 schematically shows another contemplated implementation of a currently preferred embodiment of the control board or device (200) when retrofitted on the air handler (30) of a heat pump or air conditioning system. The 5-pin power lead connector (9) and 4-pin control lead connector (208) normally connected to the standard ECM connections (2 and 203) are moved to the 5-pin power lead connection (2') and 4-pin control lead connection (203') on the control board (200). That is, the power connector (9) is removed from the ECM connection (2) and installed on like the 5-pin power lead connection (2') on the control board (200). 4-pin control lead connector (208) is removed from ECM connection (203) and installed on 4-pin control lead connection (203') on the control board (200). The activation of specific leads on the 4-pin connector or the type of signal produced is originally determined by the specific proprietary programming used by each particular system manufacturer when using the original ECM motor that is being replaced.

Figure 9A:
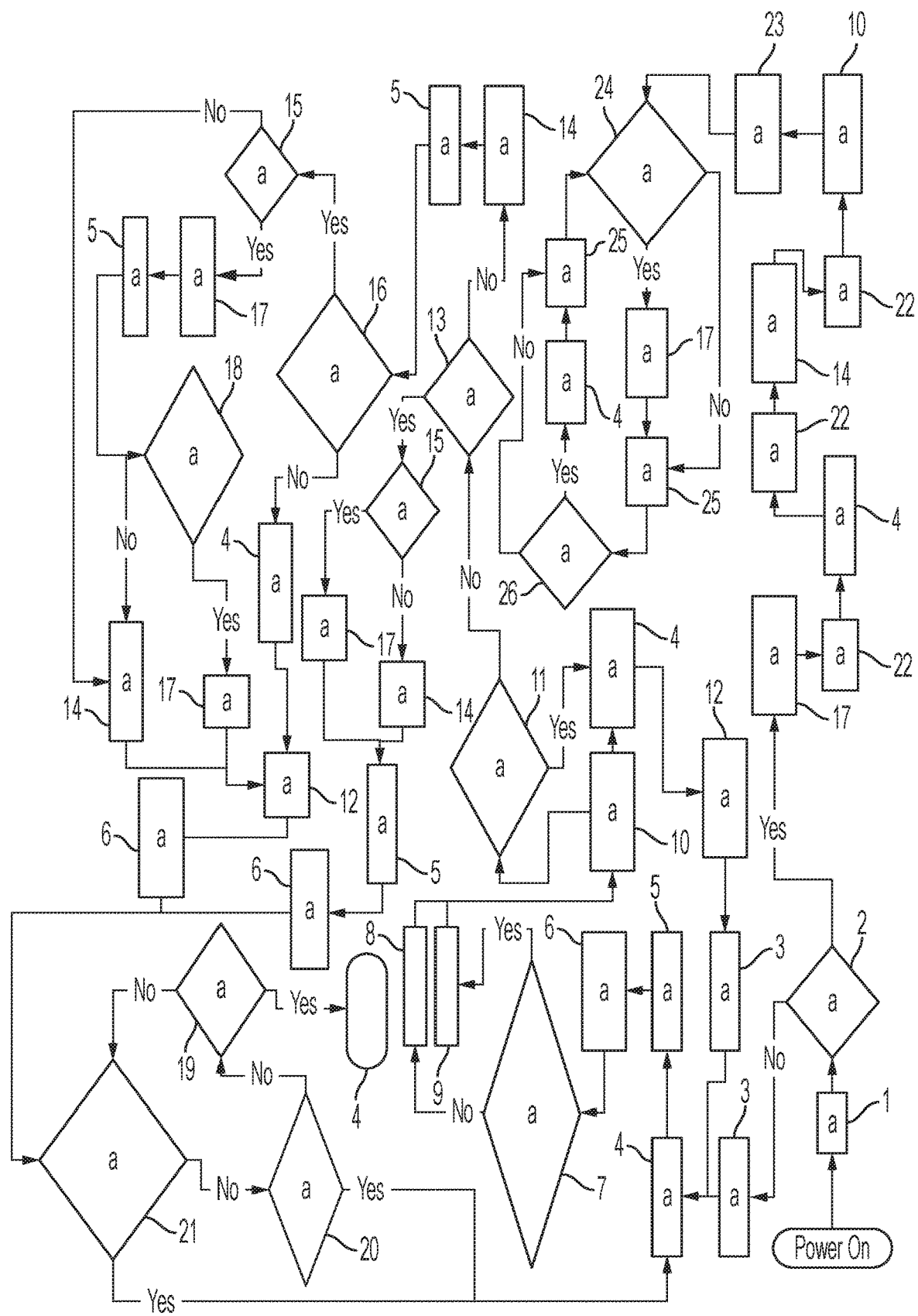

Referring to FIGS. 9A and 9B, the PSC blower is started (power on), via a control signal being sent to any one of the sixteen connectors on the ECM connector (8), which was originally connected to ECM connector (3) or one of the four connectors on the ECM connector (208), which was originally connected to ECM connector (203). The PSC blower motor is initially started on high speed, by supplying line power either 120 VAC or 208/240 VAC (from connector 2) to the High-Speed power tap on the PSC blower motor located on the indoor air handler, and the start temperature is recorded (START_TEMP). The evaporator blower operates at this speed (Run High Speed) until a predetermined time delay (DELAY_RUN) has occurred (or the unit cycles off). After the time delay (DELAY_RUN), if the unit is still operating, then the evaporator coil surface temperature is recorded (Set PREV_TEMP=currently recorded temperature), and the evaporator blower motor speed is reduced to the medium speed (Run MEDIUM speed), by removing power from the High-Speed tap and instead supplying power to the Medium-Speed tap. The evaporator blower operates at this speed until a predetermined time delay (DELAY_RUN) has occurred (or the unit cycles off). After the time delay (DELAY_RUN), if the unit is still operating, then the evaporator coil surface temperature is measured. If the absolute value of the temperature difference between newly measured temperature and the earlier stored temperature (PREV_TEMP) is more than or equal to a predetermined amount (HIGH_MEDIUM_DELTA), that is Absolute Value (PREV_TEMP−current measured temperature)≥TEMP_DELTA, then the evaporator blower motor speed is increased back to the high speed (Run HIGH Speed), by removing power from the Medium-Speed tap and instead supplying power to the High-Speed tap. The unit operates at this high-speed until the unit cycles off or this test is rechecked after some time period, typically 15 minutes to 2 hours later (MAX_REOPT_TIME). No information is saved when the unit cycles off. When the unit cycles back on, all comparisons are started all over again.

Alternatively, if the absolute value of the temperature difference between newly measured temperature obtained at the Medium Speed setting and the earlier stored temperature (PREV_TEMP) which was obtained at the high speed is less than the predetermined amount (HIGH_MEDIUM_DELTA), that is Absolute Value of (PREV_TEMP−currently measured temperature)<HIGH_MEDIUM_DELTA then the evaporator blower motor speed is reduced to the low speed (Run LOW speed) by removing power from the Medium-Speed tap and instead supplying power to the Low-Speed tap. After the time delay (DELAY_RUN), if the unit is still operating, then the evaporator coil surface temperature is again measured. If the absolute value of the temperature difference between newly measured temperature and the earlier stored temperature (PREV_TEMP) which was obtained during high speed operation is more than (or equal to) the predetermined amount (HIGH_LOW_DELTA), then the evaporator blower motor speed is increased back to the medium speed (Run MEDIUM speed), by removing power from the Low Speed tap and instead supplying power to the Medium-Speed tap. The unit operates at this speed until the unit cycles off or this test is rechecked after some time period, (MAX_REOPT_TIME), typically 15 minutes to 2 hours. No information is saved when the unit cycles off and when the unit cycles back on, all comparisons are started all over again.

Alternatively, the previous temperature can be used to determine if the unit is in cooling or heating mode, and when the unit is in heating mode determined by an increase in the evaporator temperature as the unit is activated, the minimum blower speed can be set to medium instead of low. That is, when the unit is in heating mode (not in cooling mode), the minimum fan speed can be set to medium avoiding the low speed test for situations when the unit is in heating. This is most applicable when heating is supplied by a furnace rather than a heat pump but cooling is supplied by an air conditioner.

The optional PSC blower motor speed test can be defeated when an optional humidity sensor detects humidity levels above some predetermined high value, typically anywhere above 30%. We have used 55% in our currently preferred embodiment. When high humidity is detected, the blower motor speed should be set to the lowest possible setting to maximize humidity removal. It can be set to Low speed always or low speed when in cooling mode and medium speed when in heating mode.

A run timer can be used and if the unit should operate longer than MAX_REOPT_TIME without cycling off by the thermostat controlling the unit, then the test can be repeated. The temperature difference (HIGH_MEDIUM_DELTA) can be anywhere from 0.0 degree Fahrenheit to 10 degrees Fahrenheit, but our currently preferred embodiment uses a 2.5 degree Fahrenheit difference and the temperature difference (HIGH_LOW_DELTA) can also be anywhere from 0.0 degree Fahrenheit to 10 degrees Fahrenheit, but our currently preferred embodiment uses a 3.5 degree Fahrenheit difference. The time delay (Wait DELAY_RUN) can be anywhere from 30 seconds to 10 minutes, but our currently preferred embodiment uses a two minute and twenty second delay. The MAX_REOPT_TIME can be anywhere between 6 minutes and 24 hours, but our currently preferred embodiment uses 15 minutes. The time delays (DELAY_RUN and MAX_REOPT_TIME) and temperature difference (HIGH_MEDIUM_DELTA and HIGH_LOW_DELTA) can be permanently stored in the board's logic circuitry, requiring only a single number, namely the temperature (PREV_TEMP) which can be temporally stored in memory only during powered operation.

No information needs to be stored when the control board (100) is not being activated by a heating or cooling 24 VAC control signal. There is also no need to know the OEM programmed logic or which of the four or sixteen control connections should be monitored by the control board, since all the applicable low-voltage pins are isolated and monitored to provide the exact same function, namely initiating the speed section algorithm just described. This algorithm and not any specific OEM motor programming is used to determine the proper air flow for the system, making this ideal for failed Variable Air Flow Rate blower ECM replacement applications where a less expensive PSC motor or constant torque ECM replacement motor is being used.

Our inventive concept is, of course, not limited to three blower speed control nor is the concept limited to only replacing Variable Air Flow Rate ECMs, or using PSC motors as the replacement, but can easily be extended to replacing any type of motor including any form of motor. This end effect provides variable blower air flow using the control board and some sort of motor with multiple selection connectors to vary the motor's characteristics.

Our inventive concept is also not limited to using only a PSC motor. The blower control could instead provide power to one of the torque taps on a generic Constant Torque ECM instead of one of the speed taps on a PSC motor and use the same logic to determine the optimum torque setting, this time starting with the highest torque setting instead of the highest speed setting as was the case with the PSC motor. The remaining logic is the same, by simply substituting torque tap for speed tap when describing the logic. The blower control could instead provide power to one of any type of power taps on a motor instead of one of the speed taps on a PSC motor and use the same logic to determine the optimum motor power setting, this time starting with the highest air flow rate setting instead of the highest speed setting as was the case with the PSC motor. The rest of the logic remains the same, simply substitute air flow rate setting tap for speed tap when describing the logic.

Our invention will work for any vapor compression cooling or refrigeration system where the energy flow to the evaporator or from the condenser is controlled by a fan or blower motor or a fluid pump, as long as the motor on the fan, blower or pump being used has multiple fixed power taps, such as speed or torque taps, that can be accessed to enable different air flow rates.

Our novel discovery can also be extended to the outdoor condenser fan, if the condenser ECM is replaced with the control board of this invention and a multi-air-flow-rate motor including but not limited to a multi-speed tap PSC motor or multi-torque tap ECM. At the current time, however, condenser fan motors with multiple air flow rate electrical connection taps are not commonly used.

While the previous discussion related to air conditioners and heat pumps, the present invention can also be used where a vapor compression heat pump or air conditioner is used with a gas, oil or electric furnace. Such an arrangement is generally discussed in U.S. Pat. No. 4,648,551 where an ECM is used as the blower motor for air delivery. For furnace applications, the indoor blower typically operates at a speed that is different from the speed when a vapor compression cycle is used. In the preferred embodiment of control logic illustrated in FIG. 9A, when in heating mode, as determined by the temperature sensor not cooling down when the system is activated, the minimum fan speed is set to medium and not low, so that overheating of the ductwork, due to the reduced air flow, does not occur. In this case, the blower motor fan speed modulation logic still checks for the optimum speed, which if the heating is provided by electric resistance heating or a furnace, will not change the indoor coil temperature, and therefore will settle on medium speed. If heat pump heating is being used, however, the indoor coil, acting as the condenser, will have the blower motor speed selected from one of high or medium to minimize energy consumption following the same logic used in cooling mode, namely if negligible temperature difference occurs between high speed and medium speed operation, then medium speed operation is selected to reduce energy consumption.

The foregoing describes examples of the various ways available to one skilled in the art as a method to employ the present invention to provide optimized blower air flow by minimizing motor power consumption, whenever the reduced power consumption has minimal effect on the evaporator or condenser temperature. One skilled in the art would be able to use our invention with a wide assortment of blower or condenser motors both in cooling or heating mode.

Because the present invention decides on the proper blower air flow based on the logic presented in this disclosure and does not rely on the specific communication from the OEM control board that normally controls the blower ECM flow rate setting, we only use the signals from 16-pin or 4-pin communication setting to determine that the OEM control board desires the ECM to be operating (at some speed). We do not need to know the speed being specified, since we utilize our own control algorithm, as described herein, to set the motor speed. This reduces the need to understand all the different possible protocols used by the different OEMs, and simplifies the installation. Our control board provides all 16- or 4-pin communication connection locations to allow the installer to simply connect to the exact same labeled connection point. As stated earlier, these connection points are all isolated but monitored to determine when the operate the replacement motor, but the exact connection terminal or message structure or message protocol has no bearing on the operation of our invention because the air flow logic of our invention is used to determine the proper motor setting and not the specific motor connections or the OEM's original motor programming.

Figure 10:
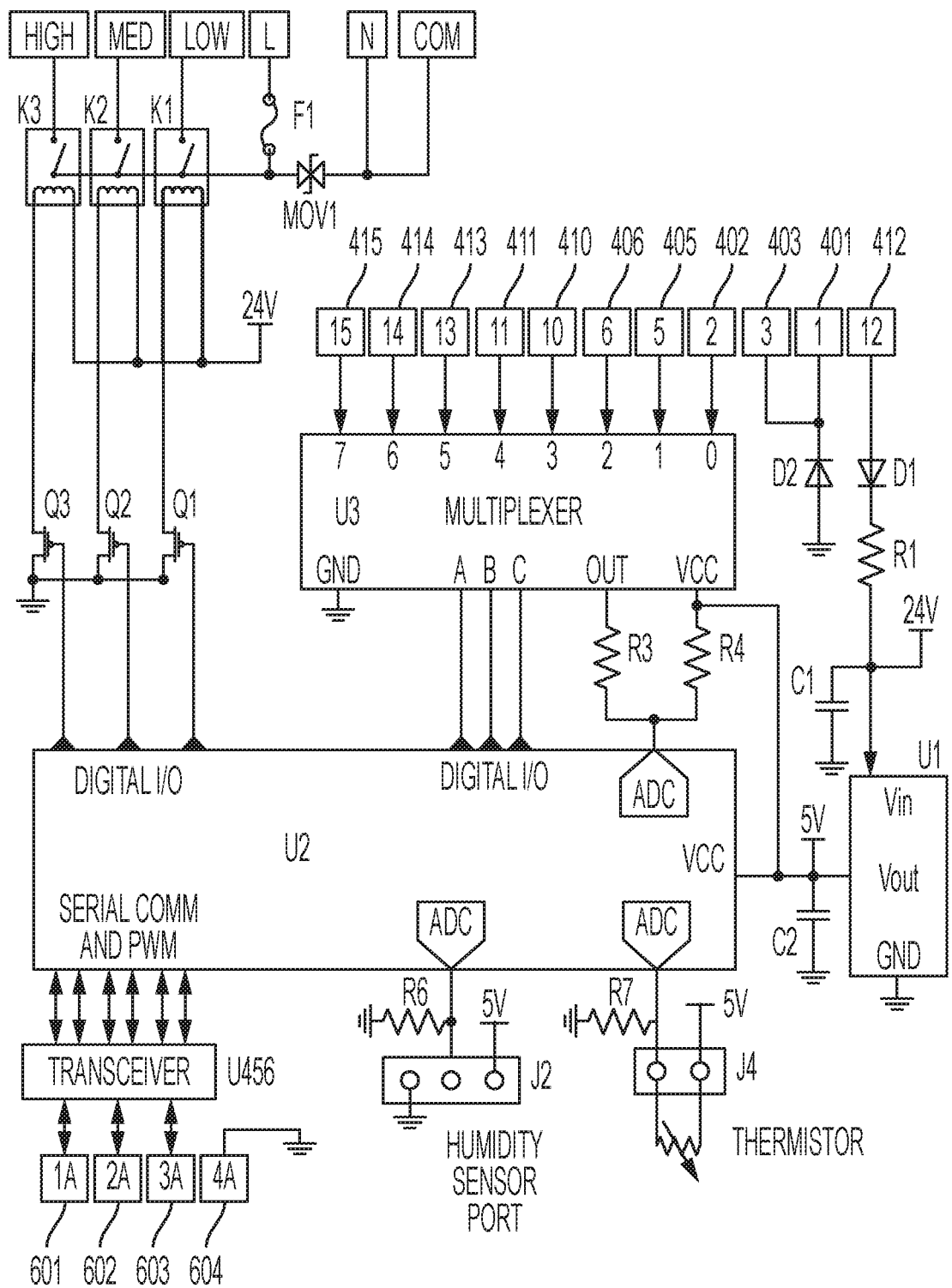
FIG. 10 is an electrical schematic of one currently contemplated embodiment of the electronic controller board.

FIG. 10 is an electrical schematic of one currently contemplated embodiment of the electronic controller board, including a core microprocessor element U2 (as shown in the preferred embodiment as a Freescale RS08 series microcontroller), a thermistor connected to J4, relays K1, K2, and K3, relay driver circuitry components Q1-Q3, a low voltage supply U1, D1, D2, C1, C2, R1, a bi-lateral multiplexer U3, voltage offset divider R3, R4, and bi-directional transceivers U4-U6. A temperature sensor to be used can be selected from any one of commercially available resistance-based temperature sensors, such as a standard thermistor or resistance temperature detector (RTD), both of which change resistance proportional to the temperature of the element. This is shown in FIG. 10 as thermistor connected to J4 in a voltage divider with resistor R7. A small microprocessor element U2 can be comprised of a simple 8-bit microcontroller that records temperatures in the procedure as described above and uses the relays K1 through K3 to switch the input power to one of the three speed taps of the blower motor during cooling or heating operation. N-channel MOSFETs Q1, Q2, Q3 interface between microcontroller U2 and relays K1, K2, K3. U3 is an 8 to 1 channel bi-lateral multiplexer able to the select the appropriate control input voltage to sample by the microcontroller U2 analog to digital converter through the R3, R4 offset voltage divider. Transceivers U4-U6 convert the lower current PWM/serial communications used by the microcontroller U2 to higher currents for input and output signaling. Supply U1, D1, D2, C1-C2, and R1 is a simple, conventional power supply capable of interfacing between the 24 VAC control voltage and the logic level voltage needed to run the low voltage electronics.

Of course, one skilled in the art can make modifications to the board shown in FIG. 10. For example, one may replace resistor R7 with a Wheatstone bridge-style current loop measurement circuit for improved accuracy, or add an additional resistor and voltage regulator in series with divider resistor R7 to maximize temperature independence at the expense of adding additional parts and increasing the cost of the controller. While shown in the preferred embodiment as driving the relays with low-side N channel MOSFETs Q1, Q2, Q3, one may easily change relays K1-K3 with lower voltage and current devices enabling direct connection to the microcontroller thus removing the need for the N channel MOSFETs and or relays K1-K3. The microcontroller U2 could be changed to any other particular microcontroller depending on the circuit designer's preference to achieve the same functionality. Likewise, the power supply U1, D1, D2, C1, C2, R1 could be replaced with a wide number of different voltage regulation/conversion modules or circuits for the same functional purpose of providing a logic-level voltage and power output to the controller.

Adding additional speeds is a minor modification for one skilled in the art by simply adding another switching relay and an additional input to the microprocessor and associated driver switch and resistor. If the system being retrofitted has more speed taps than there are microprocessor pins, a larger microprocessor can be used with a greater number of pins.

While we have shown and described several embodiments in accordance with the present invention, it should be clearly understood that the same is susceptible to even further modifications without departing from the scope of the appended claims. Therefore, we do not intend to be limited to the details shown and described herein but intend to cover all changes and modifications that fall within the scope of the appended claims.

We claim:

1. A vapor-compression system having an evaporator with an associated blower and an electronically commutated blower motor, wherein the electronically commutated blower motor has a 5-pin power lead 120/240 VAC electrical connection configured to receive a 5-pin power lead connector and has a 16-pin control lead connection configured to receive a 16-pin control lead connector, wherein the improvement comprises:
 a permanent split capacitor blower motor having a common post and at least one speed tap; and
 a control board, wherein the control board comprises:
  a 5-pin power lead connection configured to receive the 5-pin power lead connector that was connected to the 5-pin power lead 120/240 VAC electrical connection on the electrically commutated blower motor;
  a 16-pin control lead connection configured to receive the 16-pin control lead connector that was connected to the 16-pin control lead connection on the electrically commutated blower motor;
  a common post on the control board configured to connect a common wire from the control board to the common post on the permanent split capacitor blower motor;
  at least one speed tap on the control board configured to connect a wire from the control board to the at least one speed tap on the permanent split capacitor blower motor;
  a temperature connector on the control board configured to connect a temperature sensor, positioned in airflow from the evaporator, to the control board; and
  circuitry configured to receive line voltage from the control board 5-pin power lead connection and low voltage from the control board 16-pin control lead connection the circuitry configured to send line voltage to the at least one speed tap, and the circuitry configured to receive from the temperature connector a measured temperature of the airflow from the evaporator.

2. A vapor-compression system having an evaporator with an associated blower and an electronically commutated blower motor, wherein the electronically commutated blower motor has a 5-pin power lead 120/240 VAC electrical connection configured to receive a 5-pin power lead connector and has a 4-pin control lead connection configured to receive a 4-pin control lead connector, wherein the improvement comprises:
 a permanent split capacitor blower motor having a common post and at least one speed tap; and
 a control board, wherein the control board comprises:
  a 5-pin power lead connection configured to receive the 5-pin power lead connector that was connected to the 5-pin power lead 120/240 VAC electrical connection on the electrically commutated blower motor;
  a 4-pin control lead connection configured to receive the 4-pin control lead connector that was connected to the 4-pin control lead connection on the electrically commutated blower motor;
  a common post on the control board configured to connect a common wire from the control board to the common post on the permanent split capacitor blower motor;
  at least one speed tap on the control board configured to connect a wire from the control board to the at least one speed tap on the permanent split capacitor blower motor;
  a temperature connector on the control board configured to connect a temperature sensor, positioned in airflow from the evaporator, to the control board; and
 circuitry configured to receive line voltage from the control board 5-pin power lead connection and low voltage from the control board 4-pin control lead connection, the circuitry configured to send line voltage to the at least one speed tap, and the circuitry configured to receive from the temperature connector a measured temperature of the airflow from the evaporator.

* * * * *